United States Patent [19]

Miles

[11] 4,088,122

[45] May 9, 1978

[54] FIELD BURNING APPARATUS

[75] Inventor: Thomas R. Miles, Portland, Oreg.

[73] Assignee: State of Oregon, Salem, Oreg.

[21] Appl. No.: 713,444

[22] Filed: Aug. 11, 1976

[51] Int. Cl.² ............................................. F23C 5/00
[52] U.S. Cl. .............................. 126/271.2 R; 47/1.44
[58] Field of Search ................................ 47/1.42, 1.44; 126/271.1, 271.2 R, 271.2 A, 271.2 C, 59.5; 98/46, 59, 60

[56] References Cited

U.S. PATENT DOCUMENTS

| | | | |
|---|---|---|---|
| 1,571,883 | 2/1926 | Belanger | 126/271.2 A |
| 1,704,043 | 3/1929 | Green | 126/271.2 A |
| 1,899,704 | 2/1933 | Lutz | 126/271.2 A |
| 2,725,875 | 12/1955 | Broad | 126/271.2 A |
| 3,570,423 | 3/1971 | Hemmingson | 98/60 |

*Primary Examiner*—Ronald C. Capossela

*Attorney, Agent, or Firm*—Kolisch, Hartwell, Dickinson & Stuart

[57] ABSTRACT

Apparatus for thermally cultivating a field including a wheel-supported vehicle having elongate frame members and a burning chamber over the ground. A draft stack and an air mover are disposed at a forward end of the vehicle and an igniter is disposed beneath the stack. When combustible material is ignited, the air mover is operated to discharge air upwardly through the stack to thereby induce a draft. The induced draft draws air and products of combustion from the burning chamber toward and upwardly through the stack. The forwardly moving fire continuously advances flame against unburned combustible material as the vehicle moves forwardly. The fire is thus continuously propagated. The apparatus additionally includes stowable side sections so that a predetermined vehicle width may be presented for roadway transport.

25 Claims, 19 Drawing Figures

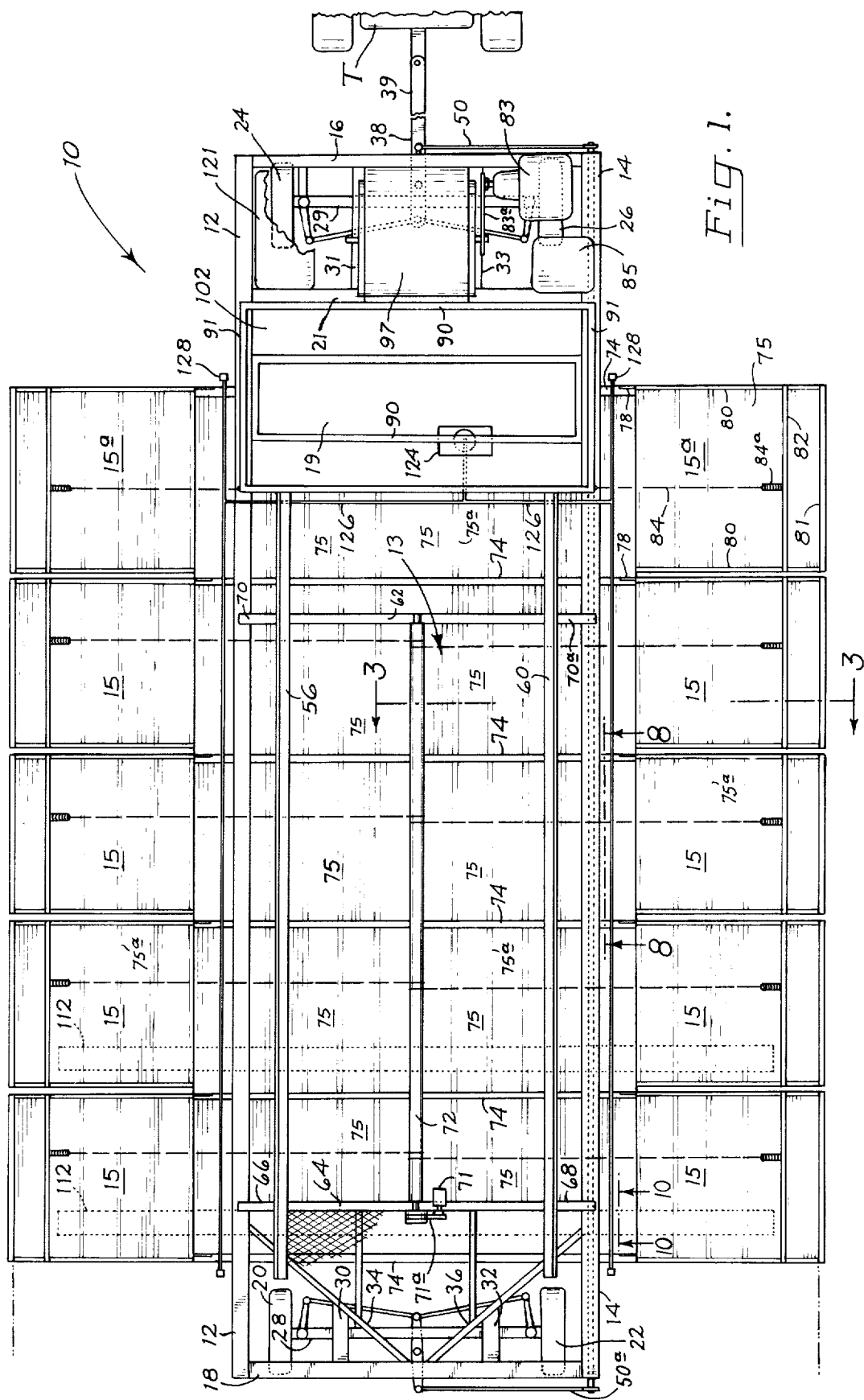

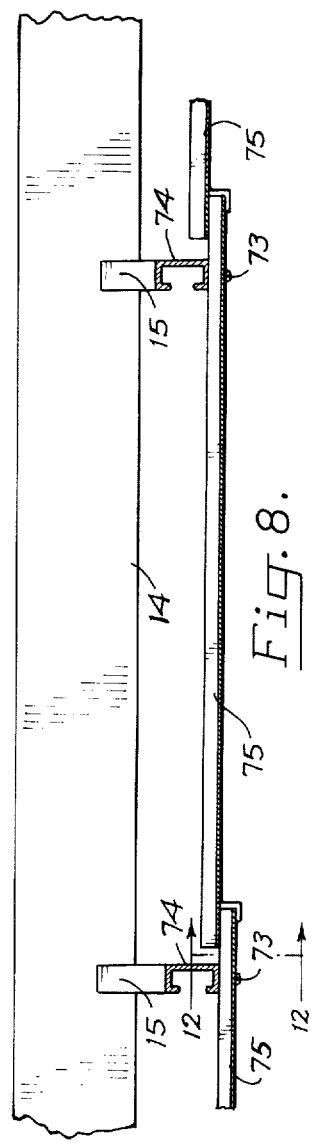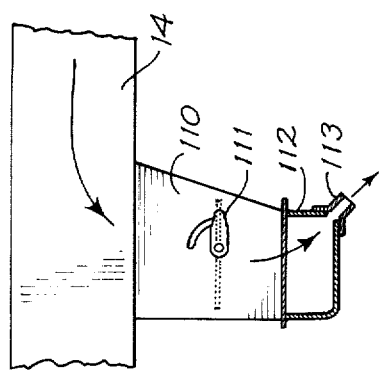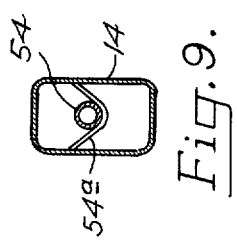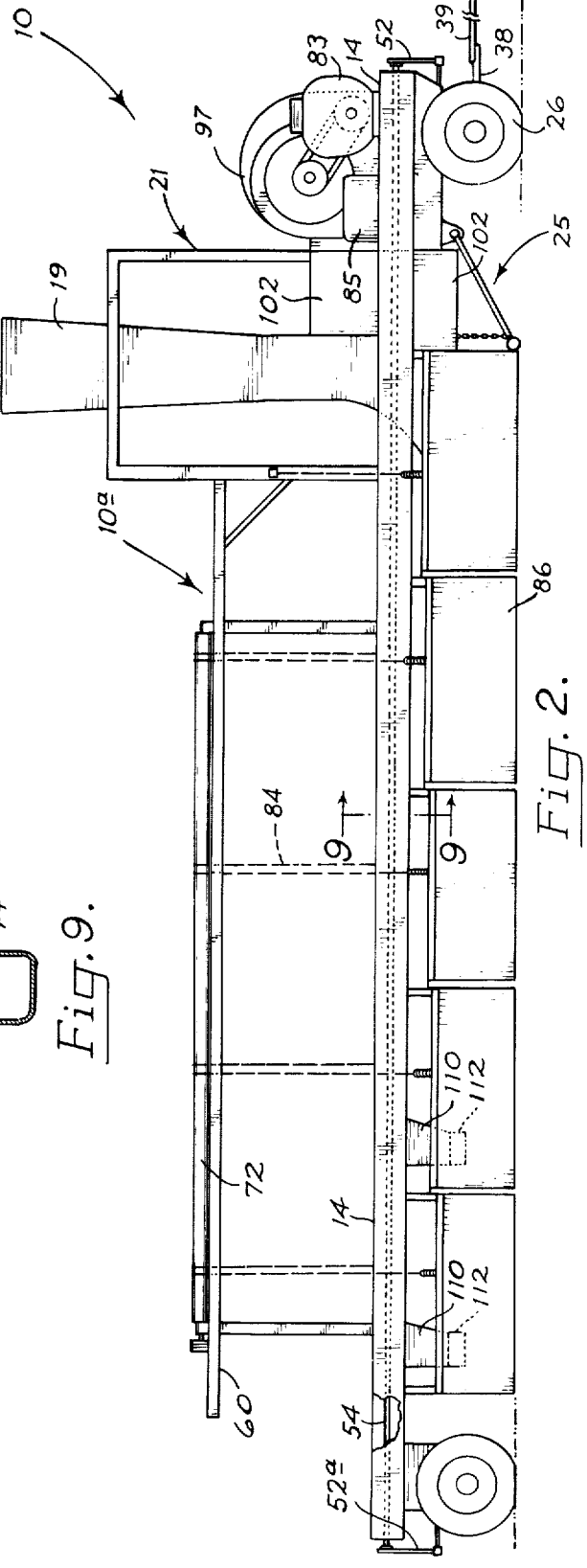

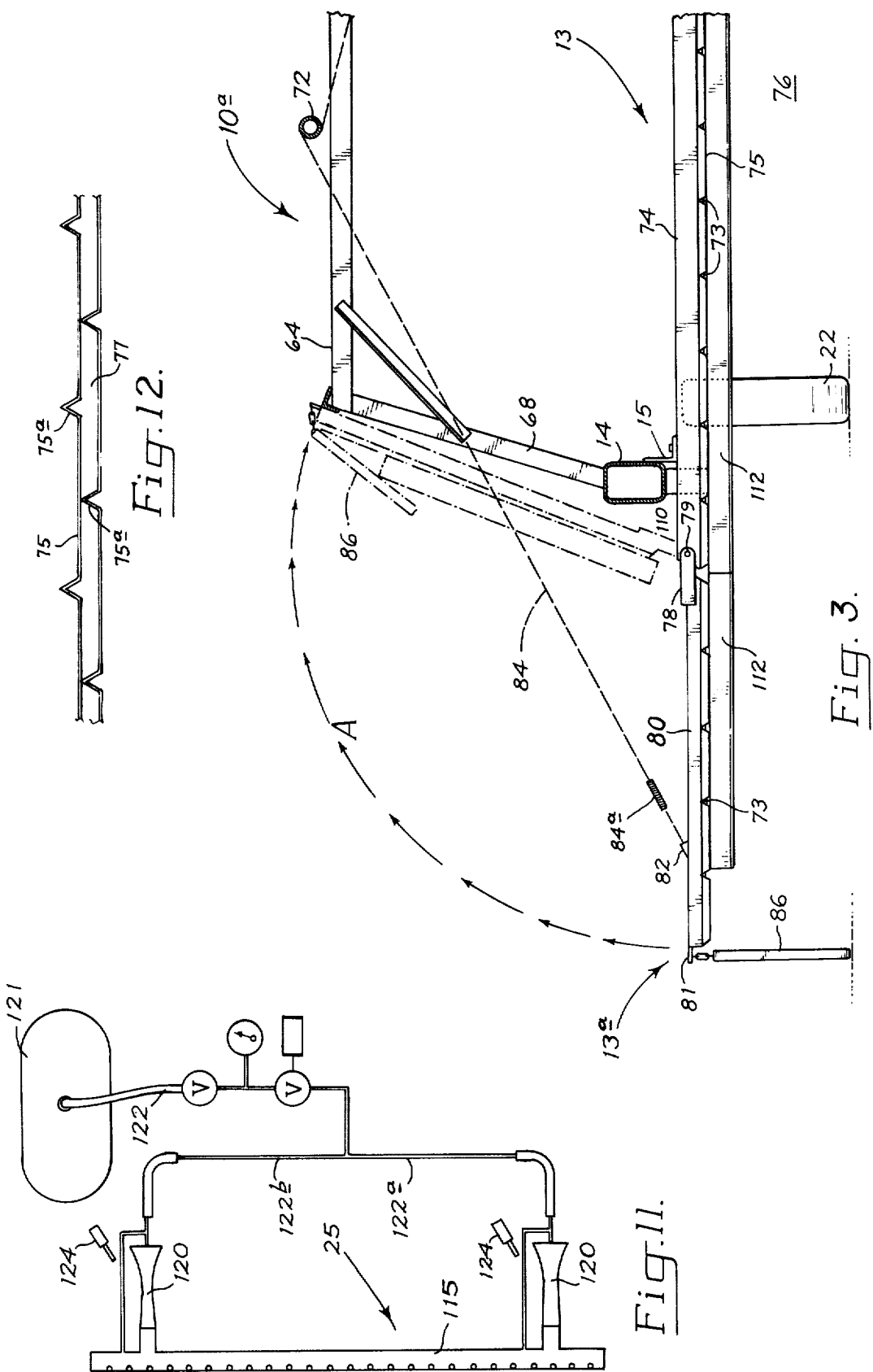

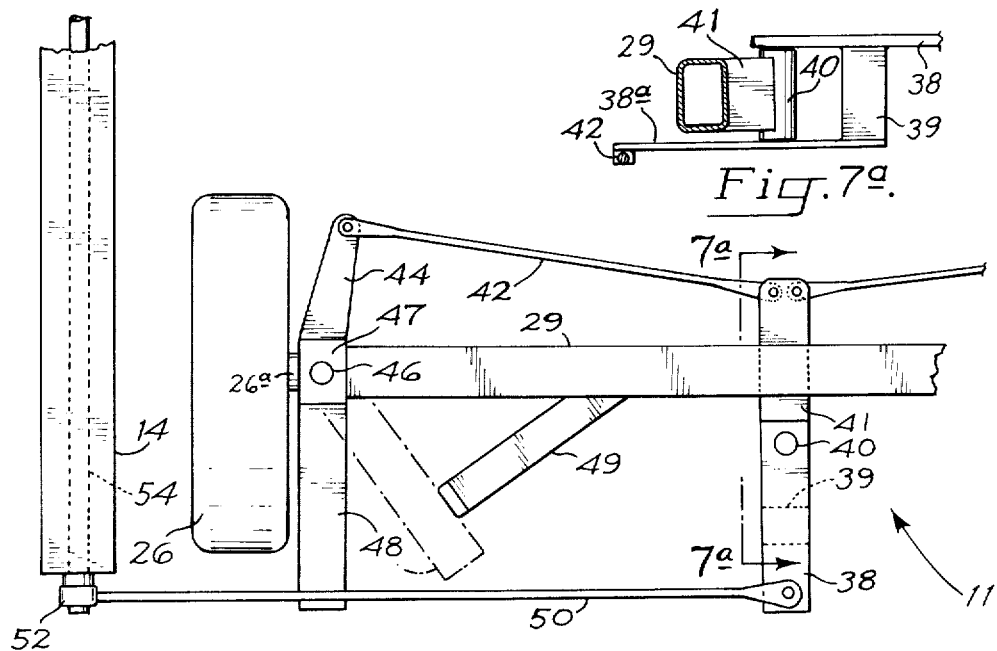
Fig. 7a.
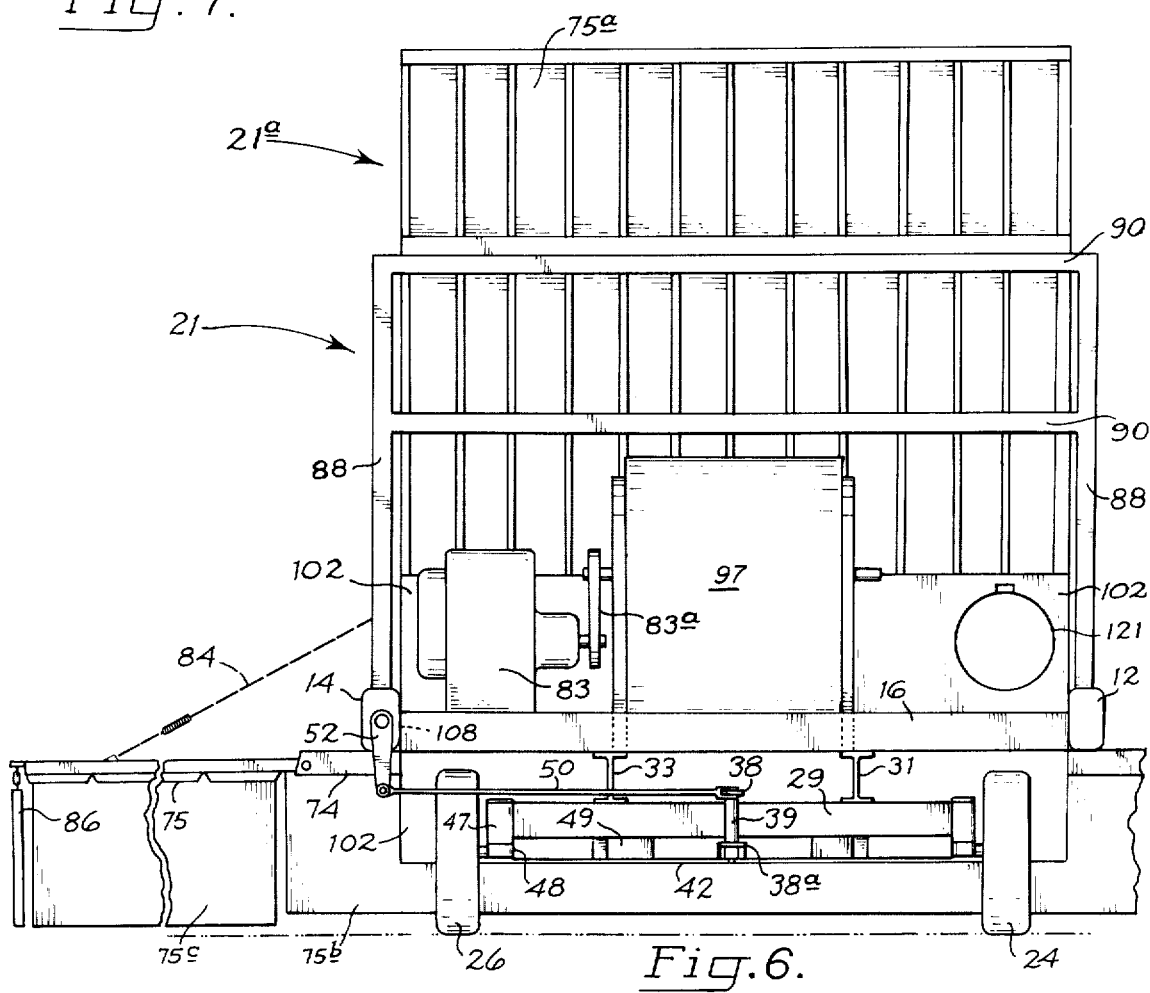
Fig. 7.
Fig. 6.

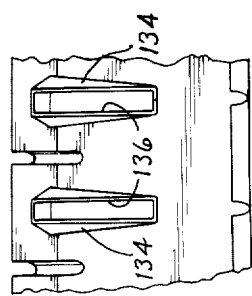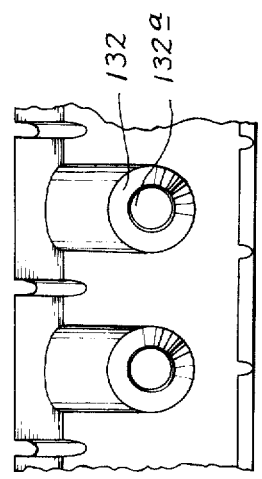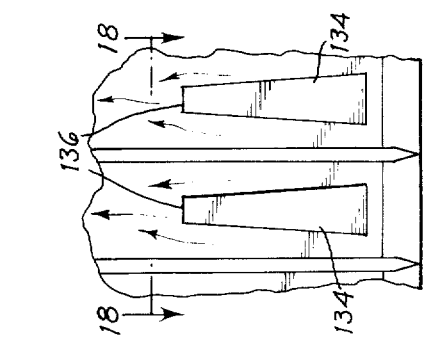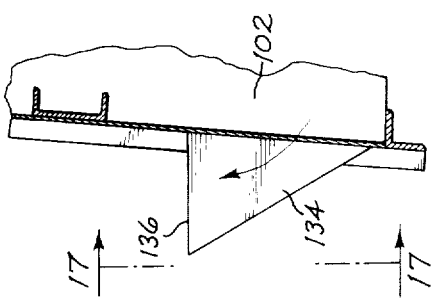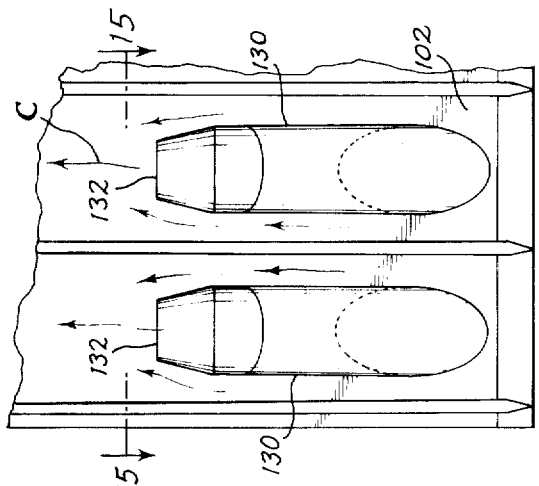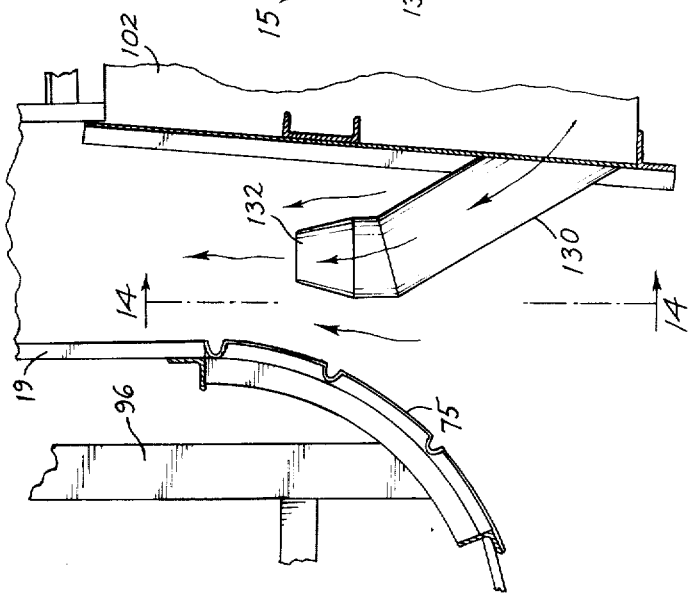

FIELD BURNING APPARATUS

BACKGROUND OF THE INVENTION

The present invention relates to field burning apparatus, and more particularly to an apparatus for thermally cultivating a field by continuously advancing fire in the direction of travel of the apparatus after combustible material on the field has been initially ignited.

In certain types of agriculture, it is often desirable to thermally cultivate the land. For instance, after a crop has been harvested, residue such as straw must be removed either through gathering or burning. Machine gathering is time consuming and expensive and the problem still remains with respect to disposing of the gathered residue.

A more effective alternative to gathering is so-called thermal cultivation which involves setting fire to a field. Such thermal cultivation not only burns away combustible residue material, but also kills bacteria, insect pests and fungi. In the production of certain types of grass seeds, harvest must take place in a relatively short time period after which straw residue must be removed. Open field burning has proved effective in cleansing the crop after harvest and rapidly removing excess straw.

Open field burning is generally accomplished by the setting of large fires and controlling the spread of fire by use of water trucks, etc. However, open field fires carry flame and smoke high into the air, thus adding smoke pollution to the atmosphere. With the increased levels of air pollution due to automobiles, industry, etc., open field burning has come under attack as merely adding to the overall levels of unacceptable pollution. As a consequence, legislation has been proposed to eliminate or substantially lessen open field burning. In response to such legislation, various machines have been designed which will contain a fire over a specified field region for producing emissions essentially at ground level. Such machines typically take the form of large and bulky wheeled vehicles which move over the surface of a field and provide a source for igniting and continuously maintaining a fire beneath a covered portion of the machine.

Unfortunately, these machines suffer from a number of significant drawbacks. First of all, the heat built up in such a burning apparatus is quite high, and must be removed along with smoke through a stack. Prior art machines may take the form of large, covered machines having multiple stacks arranged on top of the burning region. These stacks include exhaust fans integrally arranged within the stack to remove products of combustion but because of excessive heat, the fans are subject to destruction.

Another problem present in prior art machines is that the machines are extremely difficult to transport because they are bulky and heavy. Prior art machines are constructed of fixed dimensions and often may not be effectively transported over highways because of their large width and heighth.

Another problem present in prior art machines resides in the fact that burners must be continuously operated in order to maintain a fire within a machine's burning chamber. Furthermore, it has proved difficult to contain a fire within the burning chamber because fire tends to spread out underneath the sides of the burning chamber to other regions of the field.

Prior art machines also suffer from the drawback that complete combustion does not take place at a rearward part of the machine due to excessive smoke build up. Complete combustion of straw may not occur and excessive carbon residue may remain on the field after a machine passes thereover.

SUMMARY OF THE INVENTION

The present invention provides a burning apparatus for thermally cultivating a field which includes a wheel supported vehicle having a cover elevated from the ground in order to provide a furnace or burning chamber. A draft stack is disposed on a forward portion of the vehicle and an air mover induces a draft upwardly through the stack. The draft creates a negative pressure within the burning chamber and air is drawn forwardly from the chamber upwardly through the stack for continuously advancing fire in the direction of travel of the vehicle. In operation, it is only necessary to initiate a fire, as the advance of air due to the induced draft continuously advances the fire over unburned combustible material.

It is a general object of the present invention to provide a field burning apparatus which uses an induced air flow to continuously advance flame toward the front of the apparatus after combustible ground material has been initially ignited. The forwardly advancing flame also generates substantial heat which dehydrates the combustible material thus preparing it for ignition by the flame.

Another object of the present invention is to provide a field burning apparatus in which an air mover for discharging air upwardly through a stack is arranged externally of the stack so that the air mover is not subjected to direct contact with excessive temperatures resulting from the burning of the ground material.

Still another object of the present invention is to provide a readily transportable field burning apparatus having movable cover sections disposed on either side of a central cover section. The movable cover sections are stowable so that the apparatus presents a predetermined width suitable for highway travel. The cover sections may be extended laterally of the central cover section in order to provide a relatively large burning chamber.

Still another object of the present invention is to provide a field burning apparatus which essentially maintains a negative pressure within the burning chamber by means of the induced draft and which additionally includes air ducts extending from the air mover to a rearward region of the machine in order to discharge air into a rearward portion of the burning chamber. Such discharge will increase the amount of oxygen at the rear of the burning chamber for enabling complete combustion to take place while also directing air toward the draft stack. Longitudinal frame members of the machine may be constructed hollow in order to provide suitable air ducts.

Another object of the present invention is to provide a field burning apparatus having interconnected, steerable front and rear wheel sets. The wheel sets are operatively connected by means of an elongate link extending through the longitudinal, hollow frame member.

These and additional objects of the present invention will become more readily apparent from a consideration of the drawings and the following detailed description.

BRIEF DESCRIPTION OF THE DRAWINGS

Novel features of the improved field burning apparatus in accordance with the present invention will be more readily appreciated from a consideration of the following drawings, in which a preferred embodiment is illustrated with suitable reference characters, and which:

FIG. 1 is a top plan view of the field burning apparatus illustrating the movable cover sections in extended position wherein the apparatus is connected to a tractor for movement over a field;

FIG. 2 is a side elevation view of the field burning apparatus showing the movable cover sections in extended position;

FIG. 3 is a view taken along lines 3—3 of FIG. 1 and illustrates movement of an extended cover section to a stowed position;

FIG. 6 is a front view of the burning apparatus;

FIG. 7 is a view taken along lines 7—7 of FIG. 6;

FIG. 7a is a view taken along lines 7a—7a of FIG. 7.

FIG. 8 is a view taken along lines 8—8 of FIG. 1;

FIG. 9 is a view taken along lines 9—9 of FIG. 2;

FIG. 10 is a view taken along lines 10—10 of FIG. 1;

FIG. 11 is a schematic view of a flame igniter and associated gas piping;

FIG. 12 is a view taken along lines 12—12 of FIG. 8 and illustrates how adjacent cover sections are situated on one another;

FIG. 13 is a view, similar to a partial view of FIG. 4, showing a construction in which nozzles are used to deliver air into the draft stack;

FIG. 14 is a view taken along lines 14—14 of FIG. 13;

FIG. 15 is a view taken along lines 15—15 of FIG. 14;

FIG. 16 is a view similar to FIG. 13 illustrating the use of a different type of nozzle;

FIG. 17 is a view taken along lines 17—17 of FIG. 16; and

FIG. 18 is a view taken along lines 18—18 of FIG. 17.

DETAILED DESCRIPTION OF THE INVENTION

Figures 4, 5:
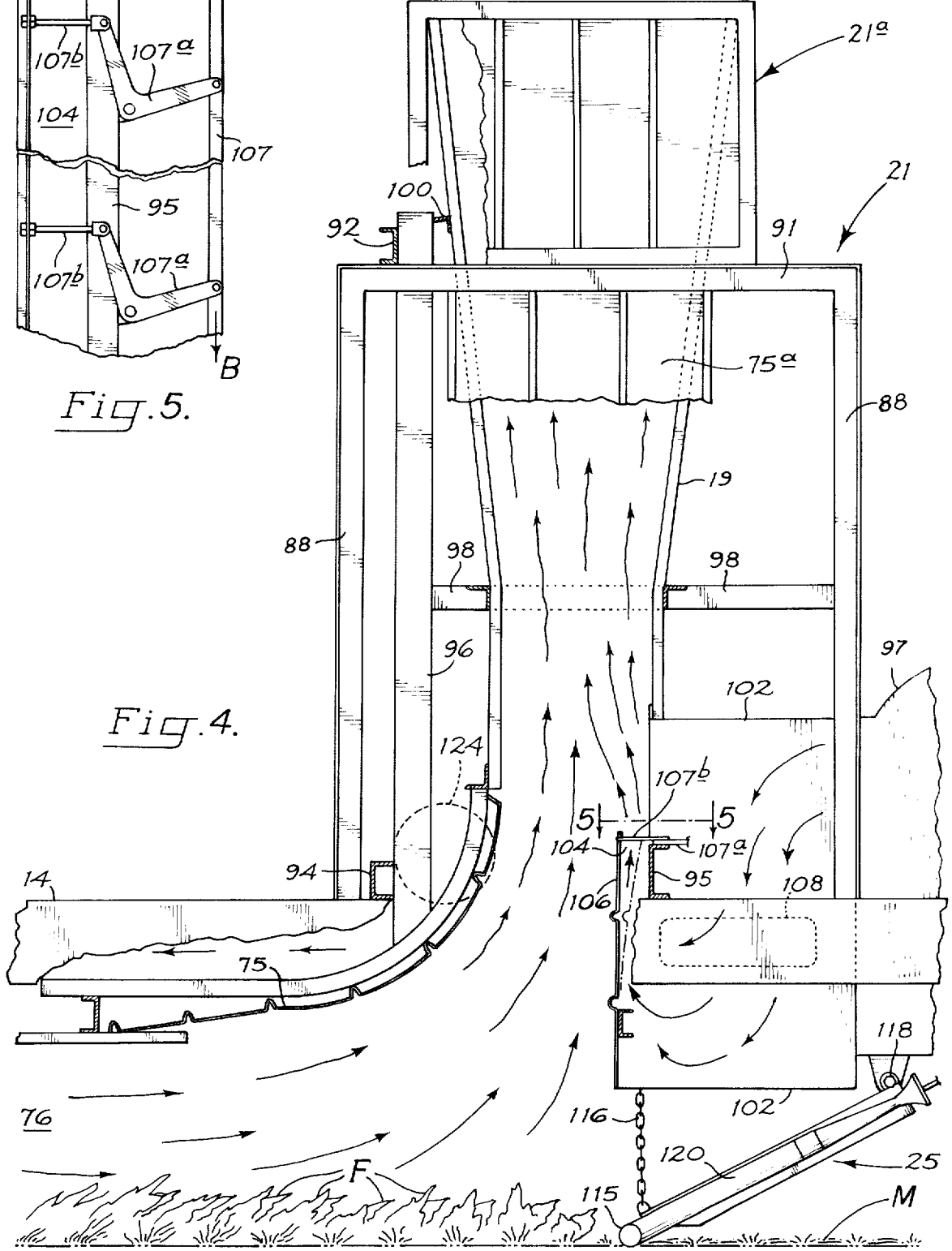
FIG. 4 is a side elevation view, partially cut away, of the draft stack of the field burning apparatus.
FIG. 5 is a view taken along lines 5—5 of FIG. 4 and illustrates a damper control.

Referring now to FIGS. 1 and 2 of the drawings, the field burner of the present invention is generally designated at 10. The field burner 10 is a wheel supported vehicle means having longitudinal, laterally opposed frame members 12 and 14 interconnected by transversely extending end frame members 16, 17 and 18. The frame members 12 and 14 are constructed as tubes.

The elongate frame members 12, 14 and the transversely extending frame members 16, 18 are supported upon rear wheels 20, 22 and front wheels 24 and 26. The wheels 20, 22 are connected to an axle tube 28 which in turn is secured to the frame members 12, 14 and 18 by means of I-beams 30, 32 and support cross members 34, 36. The wheels 24 and 26 are interconnected by an axle tube 29 which in turn is secured to the frame members 12, 14, 16 and 17 by means of I-beams 31 and 33.

A steering system, generally designated at all, is shown in FIGS. 6, 7 and 7a and operates to simultaneously steer wheel sets 20, 22 and 24, 26. A tongue 38 is adapted for connection at one end to a draw bar 39 of a tractor T or other pulling vehicle. The tongue 38 is pivotally connected to an axle-connected bracket 41 by means of a spindle 40. A second tongue 38a is also pivotally connected to the bracket 41 by the spindle 40. The tongues 38 and 38a are rigidly connected together by a connector 39 so that they will simultaneously pivot about the spindle 40.

A tie rod 42 is pivotally connected at one end thereof to the tongue 38a and at its other end to a radial arm 44. The radial arm 44 is connected to a spindle 46. The spindle 46 is journaled in an axle connected clamp 47 and axle 26a of the wheel 26 is connected to the spindle 46. A stub tongue is also connected to the spindle 46 adjacent to a lower portion thereof for contact against an axle-mounted stop bar 49 which limits the amount of turning which can take place. A similar stop bar (not shown) is provided on the other side of the axle 29. Additionally, a second tie rod 42a is connected to a spindle, etc. (not shown in FIG. 7) to the wheel 24.

In order to connect the front and rear wheel sets together, a drag link 50 is pivotally connected to the tongue 38 and also to a drag link arm link 52 which is journaled to the elongate frame member 14. The arm 52 is connected to an elongate rod 54 which extends the length of the hollow tube 14 for connection to a second drag link 50a and arm 52a. The drag link 50a is connected to the axle tube 28 and includes tie rods, etc. as described above for steering the rear wheels 20, 22. Thus, it can be appreciated that as the tongue 38 is pivoted about the spindle 40, both the front wheels 24, 26 and the rear wheels 20, 22 will be simultaneously steered. It is important for the rear wheels, 20, 22 to follow the steering of wheels 24, 26 because of the relatively long length of the field burner 10. The rod 54 is supported on a cradle 54a (see FIG. 9) within the hollow frame member 14 so as to protect the rod 54 from heat.

As shown in FIGS. 1-3, an auxiliary, elevated frame structure generally designated at 10a, is connected to the elongate frame members 12, 14. The frame structure 10a includes elongate channel members 56, 60 which are connected adjacent their ends by transverse members 62, 64. Support frame members 66, 68, 70 and 70a attach the auxiliary frame 10a to the elongate frame members 12, 14. Rotatably journaled upon the frame members 62, 64 is an elongate shaft 72. The shaft 72 is rotatable by means of a motor 71 and belt drive 71a. The function of the rotatable shaft 72 will be explained later.

Turning now to FIGS. 3 and 8, there is shown a plurality of transversely extending channels 74 connected underneath the frame members 12, 14 by means of brackets 15. A plurality of convoluted metal sheets 75 having ridges 75a are connected at a forward end thereof by means of screws 73 to the channels 74. A back end of each of the convoluted sheets 75 rests on a forward portion of the next succeeding convoluted sheet 75. The convoluted sheets 75 form a first expanse defining a cover, generally designated at 13, which is elevated over the ground as shown in FIG. 3. The cover 13 covers the entire area between the frame members 12, 14. The air space between the sheets 75 and the ground comprises a burning chamber region, generally designated at 76. In order to at least partially confine the chamber 76, movable side sections, generally designated at 13a are provided. The operability of the side sections 13a will be more particularly described hereinafter.

As shown in FIG. 12, the sheets 75 are supported on top of the next succeeding sheets' ridges 75a so that there is an air space 77 between the sheets 75.

With reference directed particularly to FIG. 3, it can be seen that each of the channels 74 has a link 78 pivotally connected at 79 thereto. Each of the links 78 is rigidly attached to a bar 80. As shown in FIG. 1, adjacent pairs of the bars 80 are connected at their outer ends by a bar 81. Connected to the bars 80 are further convoluted sheets 75. Each of the adjacent pairs of bars 80 and bar 81 along with an associated convoluted sheet 75 comprise a second expanse section generally designated at 15. Each of the second expanse sections 15 is movable and includes a lift bar 82 to which is connected a lift cable 84. Adjacent to one end of the cable 84 is a spring 84a. The other end of cable 84 is connected to the rotatable shaft 72. It can be appreciated that as the shaft 72 is rotated in a first direction, the lift cables 84 will be paid out in order to permit extension of the sections 15 so as to expand the amount of ground to be covered and confined within a burning chamber. When it is desired to transport the burner 10 over a highway or roadway having width limitations, the shaft 72 is operated so as to reel in the lift cables 84 to thereby stow each of the sections 15 against the auxiliary frame structure 10a. Such a stowed configuration is shown in FIG. 3 in the dotted lines after the sections 15 have been pivoted in the direction of the arrow "A." Front sections 15a are removed prior to transport.

Further to be noted is that each section 15, 15a includes a skirt 86 which nonrigidly depends from the bar 81. The skirts 86 aid in preventing spread of fire and define the side portions of burning chamber 76.

As shown in FIG. 4, a draft stack 19 and a supporting framework 21 are arranged at a forward end of the burner 10. The supporting framework 21 includes upright frame members 88 bridged by cross frame members 90 and 91 (see FIG. 1). The upright frame members 88 are secured to the elongate frame members 12, 14. A transversely extending channel 92 is connected to frame members 91, and another transversely extending channel 94 is connected to the elongate frame members 12, 14. Connected to the transversely extending members 92, 94 are a plurality of upright stack-supporting channels 96. The channels 96 include brackets 98, 100 to which further convoluted sheets 75a are attached to form the stack 19. An upper framework, generally designated at 21a is disposed on top of the framework 21 in order to extend the upper part of the stack 19. The stack 19 communicates directly with the interior of the burning chamber 76.

An air mover means such as a fan 97 is illustrated in FIG. 1 and is supported upon the beams 31, 33 for operation by a drive motor 83. The fan 97 is mounted on the vehicle means for drawing in ambient air and discharging it upwardly through the stack 19. A fuel tank 85 is disposed adjacent to the motor 83 and a belt drive 83a is provided to drive the shaft of the fan 97. A plenum 102 is connected to the outlet of the fan 81 for directing air upwardly through an opening 104. The opening 104 extends across the width of the stack 19. The plenum 102 extends between frame members 12, 14 as can be seen from a consideration of FIG. 6. The plenum 102 includes a movable front face or damper 106 adjustable to vary the opening 104 for selectively altering the volume of air delivered through opening 104 upwardly through the stack 19. Thus, the velocity of air introduced into the stack 19 may be varied.

The damper 106 is controlled by a movable rod 107 (see FIG. 5) which is pivotally connected to angled links 107a. The links 107a are pivotally connected to a cross member 95 and include rods 107b secured to damper face 106. Thus, as rod 107 is moved in the direction of arrow B, the link 107b will pivot so as to close damper 106. Conversely, damper 106 may be opened.

The plenum 102 communicates with openings 108 on an inside face of each of the elongate tubes 12, 14. The openings 108 permit a portion of the air flow developed by the fan 97 to be diverted through the openings 108 downwardly through the hollow elongate members 12, 14. With reference to FIGS. 2 and 10, it can be seen that at a rearward portion of the hollow elongate members 12, 14, ducts 110 depend from the members to air bars 112. Each of the air bars 112 extends transversely of the burner 10 and is provided with a slot 113 for directing air toward the front of the burner 10. A damper valve 111 is provided to vary the amount of air discharged through the air bar slot 113. FIG. 3 illustrates separable air bars 112 to enable stowing of the movable second expanse sections 15.

A flame igniter system, generally designated at 25 is illustrated in FIGS. 2, 4 and 11. An igniter bar 115 is suspended by means of a chain 116 and a pivot 118. The igniter bar 115 is connected to venturi mixers 120 which receive gas from a tank 121 via hoses 122, 122a and 122b. Glow plugs 124 are utilized for producing flame along the bar 115. The igniter bar 115 extends across the width of the burner 10 and initially ignites combustible material on the ground.

FIGS. 13-18 illustrate further embodiments for inducing air into the stack 19. For instance, in FIGS. 13-15 there is shown a plurality of nozzles 130 which extend from the plenum 102 into the stack 19. Each of the nozzles 130 includes an upper section 132 having an upper section 132a for directing air upwardly through the stack 19 in the direction of arrows C. Because the nozzle sections 132a are disposed substantially centrally of the stack 19, air is drawn upwardly about all sides of the nozzle for discharge upwardly.

Another nozzle embodiment is illustrated in FIGS. 16-18. Here, a plurality of nozzles 134 each include a generally rectangular nozzle slot 136 for delivering air from the plenum 102.

A boiler 124 is provided adjacent the stack 19 and is connected to lines 126 for delivery of steam at outlets 128. The outlets may be connected to hoses for spraying steam in order to smother escaped fire. Water within the boiler is heated to its boiling point by the fire within the chamber 76.

A cover 75b is provided at the front of the field burner 10. Additional covers 75c are secured to the front sections 15a. A cover may also be provided at the rear, at least over that portion between the members 12, 14 in order to protect the rear wheels 20, 22.

OPERATION OF THE FIELD BURNING APPARATUS

When it is desired to burn combustible material on the ground for thermally cultivating a field, the field burner 10 is transported to a selected field and the rotatable bar 72 is actuated to lower the sections 15 so that the skirts 86 contact the ground at their bottom edges. The igniter bar 115 is then actuated to ignite combustible material so that a fire is initiated at a forward end of the machine adjacent the igniter bar 115. The air mover means 81 is driven by the motor 83 to move air and induce a draft through the draft stack 19. A negative pressure is thereby created within the interior of the burning chamber 76. Consequently, air currents are continuously drawn from the burning chamber 76 toward and upwardly through the draft stack 19. After a sufficient fire has been started by the igniting system 25, the igniting system may be shut down. As the field burner 10 is moved forwardly by a connected mover such as a tractor or the like, the induced air traveling upwardly through the stack 19 continually draws air and gaseous combustion products forwardly from the burning chamber. The fire is thus pushed forwardly as shown by the flames F(FIG. 4). The flames continuously move toward unburned combustible material M as long as the burner 10 is advanced and the fan 97 operates. There is no need for operation of the igniting system 25 once a fire has been started. The forward moving flames F also generate a substantial amount of heat which dehydrates wet or green residue material. Such dehydration promotes burning.

Once a fire is burning continuously within the burning chamber 76, it can be seen that substantial build up of smoke will occur in a rearward part of the machine. Such buildup may prevent complete combustion. As a result, there may be excessive carbon residue on the combustible material. However, with air directed through the openings 108 toward the rear of the machine through the hollow elongate frame members 12, 14, air will be directed through the air bars 112 to further support combustion. Thus, complete combustion of the combustible material will take place. Additionally, the air from the air bars 110 is directed toward the stack 19 and thus aids in pushing the fire forwardly.

From the above, it may be appreciated that the present invention provides advantages over prior art field burners. For instance, a fire may be continuously advanced in the direction of travel of the burner 10 without requiring that burners be continuously operated for maintaining a fire after initial ignition. Because the fan 97 is disposed forwardly and externally from the draft stack 19, the hot gasses passing upwardly through the draft stack 19 will not contact the fan blades and cause deterioration.

While the skirts 86 aid in preventing fire from moving outwardly from the sides of the burning area covered by the burner 10, it can be appreciated that the negative pressure created by the induced draft also prevents fire from spreading.

A further advantage of the present invention resides in the fact that the steering linkage rod 54 is maintained in the hollow elongate tube 14 and is continuously subjected to a flow of air from the fan 97. As a consequence, the elongate rod 54 will not be distorted by the surrounding heat.

Because air is delivered from the air bars 112 into a rearward portion of the burning chamber 76, complete combustion is assured at the rear. The present invention provides a novel hollow frame structure which permits air to be conducted from the fan 97 to the air bars 112.

The field burner 10 of the present invention is constructed as a relatively light weight machine adapted for burning a field over a relatively large swath due to the feature of the deployable sections 15. In addition, the field burner 10 may be readily transported over highways with the sections 15 in the aforementioned stowed position so that the burner 10 presents a predetermined width. It is necessary for a burner to be readily transportable because movement from one field to another over a short period of time is required after harvesting.

While the invention has been particularly shown and described with reference to the foregoing preferred embodiment, it will be understood by those skilled in the art that other changes in form and detail may be made therein without departing from the spirit and scope of the invention as defined in the appended claims.

What is claimed is:

1. Apparatus for burning combustible material on the ground to thermally cultivate a field comprising:
    wheel supported vehicle means having a frame and a frame-connected cover means, said cover means being elevated from the ground and including side portions for defining a burning chamber;
    means disposed in said burning chamber operable for initially igniting combustible material on the ground;
    draft stack means disposed adjacent to a forward end of said vehicle means, said stack means communicating directly with said burning chamber and extending generally upwardly from said cover means; and
    air mover means disposed adjacent to said stack means operable for inducing a draft upwardly through said stack means by delivering ambient air thereinto so that a negative pressure is developed within said burning chamber, air and gaseous products of combustion being drawn from said burning chamber upwardly through said stack means for continuously advancing fire against unburned combustible material in the forward direction of travel of said vehicle means.

2. The apparatus of claim 1, wherein said air mover means is disposed forwardly of said draft stack means.

3. The apparatus of claim 1, wherein said igniting means is disposed beneath said stack means.

4. The apparatus of claim 1 including air duct means disposed on said vehicle means for conducting a portion of the air delivered by said air mover means into said burning chamber.

5. The apparatus of claim 4, wherein said air duct means extends from said air mover means to a rearward portion of said vehicle means for discharging air into a rearward portion of said burning chamber.

6. The apparatus of claim 5, wherein said frame includes at least two, laterally opposed, elongate members each of which extends substantially the length of said vehicle means, at least one of said members being a tube defining said air duct means.

7. The apparatus of claim 6, wherein at least one transversely extending duct is disposed in said rearward portion of said burning chamber in communication with said air duct means for discharging air into said burning chamber.

8. The apparatus of claim 7, wherein said transversely extending duct includes an air bar delivery means for discharging air into said burning chamber in a direction generally toward the front of said burning chamber.

9. The apparatus of claim 5, wherein said vehicle means includes steerable front and rear wheel sets, said sets being interconnected for simultaneous steering by an elongate linkage member which extends longitudinally through said air duct means.

10. Apparatus for burning combustible material on the ground to thermally cultivate a field comprising:
    wheel supported vehicle means having a frame and a cover means, said cover means including a first frame connected expanse having a predetermined width and elevated from the ground and a second expanse movably connected adjacent to said first expanse, said second expanse being selectively movable between a first position laterally extending from said first expanse and a second, stowed position on said vehicle means, said first expanse and a laterally extended second expanse defining a burning chamber, said vehicle means presenting a width substantially the same as said predetermined width for roadway travel when said second expanse is stowed;

means disposed in said burning chamber operable for initially igniting combustible material on the ground;

draft stack means disposed adjacent to a forward end of said vehicle means, said stack means communicating with said burning chamber and extending generally upwardly from said cover means; and air mover means disposed adjacent to said stack means operable for inducing a draft upwardly through said stack means and for developing a negative pressure within said burning chamber so that air and gaseous products of combustion are drawn from said burning chamber upwardly through said stack means, said air and gaseous products continuously advancing fire against unburned combustible material in the direction of travel of said vehicle means.

11. The apparatus of claim 10, wherein said frame includes at least two, laterally opposed, elongate members which support an upper frame and wherein said second expanse includes a plurality of movable sections each pivotally connected to said first expanse about pivot axes generally parallel to the longitudinal axis of the vehicle means so that said sections may be swung between a stowed, supported position against said upper frame and a position extending laterally of said first expanse.

12. The apparatus of claim 11, wherein said upper frame includes members extending upwardly from said laterally opposed members and inclined inwardly toward the middle of said first expanse, said upper frame additionally including means connected to said sections operable for selectively swinging said sections about said pivot axes.

13. The apparatus of claim 12, wherein said means operable for selectively swinging said sections includes an elongate shaft rotatably journaled to said upper frame in which a plurality of cables extend from said shaft to an associated section so that as said shaft is rotated in a first direction, said cables are wrapped therearound to operatively raise said sections, said shaft being rotatable in a second direction so that said cables are payed out to operatively lower said sections.

14. The apparatus of claim 13, wherein each of said sections includes a skirt nonrigidly connected thereto arranged to depend substantially vertically from an associated laterally extended section so as to substantially enclose said burning chamber.

15. The apparatus of claim 10, wherein air duct means are disposed on said vehicle means for conducting a portion of the air delivered by said air mover means into said burning chamber.

16. The apparatus of claim 15, wherein said air duct means extends from said air mover means to a rearward portion of said vehicle means for discharging air into a rearward portion of said burning chamber.

17. The apparatus of claim 16, wherein said frame includes at least two, laterally opposed, elongate members each extending substantially the length of said vehicle means, at least one of said members being a tube defining said air duct means.

18. The apparatus of claim 17, wherein at least one transversely extending duct means is disposed in said rearward portion of said burning chamber for discharging air delivered from said air duct means into said burning chamber.

19. The apparatus of claim 18, wherein said transversely extending duct includes an air bar delivery means for discharging air into said rearward portion of said burning chamber in a direction generally toward the front of said burning chamber.

20. The apparatus of claim 19, wherein said vehicle means includes steerable front and rear wheel sets, said sets being interconnected for simultaneous steering by an elongate linkage member which extends longitudinally through said air duct means.

21. Apparatus for burning combustible material on the ground to thermally cultivate a field comprising:

wheel supported vehicle means having a frame and a frame-connected cover means, said cover means being elevated from the ground and including side portions for defining a burning chamber;

means disposed in said burning chamber operable for initially igniting combustible material on the ground;

draft stack means disposed adjacent to a forward end of said vehicle means, said stack means communicating directly with said burning chamber and extending upwardly from said cover means;

air mover means disposed adjacent to said stack means operable for delivering ambient air to said stack means; and means for increasing the velocity of air delivered from said air mover means and for inducing a draft upwardly through said stack means.

22. The apparatus of claim 21, wherein said inducing means includes a damper means extending substantially across the width of said stack means for permitting selective flow of air from said air mover means to said stack means.

23. The apparatus of claim 21, wherein said inducing means includes a plurality of nozzles which extend from said air mover means into said stack means.

24. The apparatus of claim 23, wherein said nozzles are arranged to deliver air substantially centrally of said stack means.

25. The apparatus of claim 21, wherein said inducing means includes a plurality of elongate slots which extend from said air mover means into said stack means, said slots having their longitudinal axes generally parallel to the longitudinal axis of said vehicle means.

* * * * *